United States Patent
Hahn

(10) Patent No.: US 11,868,229 B2
(45) Date of Patent: Jan. 9, 2024

(54) SYSTEMS, METHODS, AND DEVICES FOR DEVICE IDENTIFICATION AND ACTIVITY ESTIMATION IN A COMPUTING PLATFORM

(71) Applicant: Michael R. Hahn, Saipan, MA (US)

(72) Inventor: Michael R. Hahn, Saipan, MA (US)

(73) Assignee: REVERSEADS PTE. LTD, Singapore (SG)

(*) Notice: Subject to any disclaimer, the term of this patent is extended or adjusted under 35 U.S.C. 154(b) by 232 days.

(21) Appl. No.: 17/337,168

(22) Filed: Jun. 2, 2021

(65) Prior Publication Data

US 2022/0058107 A1 Feb. 24, 2022

Related U.S. Application Data

(60) Provisional application No. 63/068,318, filed on Aug. 20, 2020.

(51) Int. Cl.

| | |
|---|---|
| *G06F 11/34* | (2006.01) |
| *G06F 11/32* | (2006.01) |
| *G06F 9/54* | (2006.01) |
| *G06F 18/214* | (2023.01) |
| *G06N 7/01* | (2023.01) |

(52) U.S. Cl.
CPC .......... *G06F 11/3452* (2013.01); *G06F 9/542* (2013.01); *G06F 11/324* (2013.01); *G06F 11/3409* (2013.01); *G06F 18/214* (2023.01); *G06N 7/01* (2023.01); *G06F 2201/86* (2013.01)

(58) Field of Classification Search
CPC ............... G06F 11/3006; G06F 11/324; G06F 11/3409; G06F 11/3438; G06F 11/3466; G06F 11/3452; G06F 18/214; G06F 9/542; G06F 2201/86; G06F 2201/88; G06N 7/01; G06N 20/00
USPC .......................................................... 702/182
See application file for complete search history.

(56) References Cited

U.S. PATENT DOCUMENTS

| | | | |
|---|---|---|---|
| 7,809,659 | B1 | 10/2010 | Paiz |
| 8,781,989 | B2 | 7/2014 | Duchon |
| 9,165,254 | B2 * | 10/2015 | Duchon ................. G06Q 10/10 |
| 10,614,483 | B1 * | 4/2020 | Zhao ................. G06F 16/24578 |
| 10,698,901 | B1 | 6/2020 | Taropa et al. |
| 2010/0280985 | A1 | 11/2010 | Duchon et al. |
| 2015/0254328 | A1 * | 9/2015 | Dereszynski ...... G06Q 30/0277 |
| | | | 707/739 |
| 2018/0285469 | A1 | 10/2018 | Hahn et al. |

OTHER PUBLICATIONS

Int'l Application Serial No. PCT/US21/46961, Int'l Search Report and Written Opinion dated Nov. 26, 2021.

* cited by examiner

*Primary Examiner* — John H Le
(74) *Attorney, Agent, or Firm* — Kwan & Olynick LLP

(57) ABSTRACT

Systems, methods, and devices identify devices and assign keywords to such devices. Methods include retrieving data from at least one data source, the data comprising a plurality of data events associated with a plurality of devices, and generating a plurality of probability metrics for each of the plurality of devices based on device information and data event parameters included in the retrieved data. Methods also include generating an activity estimation parameter for each of the plurality of devices based on the plurality of probability metrics, the activity estimation parameter comprising an estimated probability of a subsequent data event being taken by a device.

20 Claims, 7 Drawing Sheets

SYSTEMS, METHODS, AND DEVICES FOR DEVICE IDENTIFICATION AND ACTIVITY ESTIMATION IN A COMPUTING PLATFORM

CROSS-REFERENCE TO RELATED APPLICATIONS

This application claims the benefit under 35 U.S.C. § 119(e) of U.S. Provisional Patent Application No. 63/068,318, filed on Aug. 20, 2020, which is incorporated herein by reference in its entirety for all purposes.

TECHNICAL FIELD

This disclosure generally relates to computing platforms, and more specifically, to identification and behavior estimation of devices associated with computing platforms.

BACKGROUND

Devices may communicate with other entities via a communications network, or a broader network, such as the internet. Such devices may be communications devices, such as a computer system or a mobile communications device, and they may be configured to execute a browser application to navigate various webpages on the internet. Such devices may also have various identifiers associated with them, such as device identifiers specific to hardware included in the devices themselves. The devices may also have identifiers associated with software applications, such as the browser application, executed on the devices. Conventional systems and techniques remain limited in their ability to utilize such identifiers to identify such devices and predict behavior of such devices as the devices transition from one computing environment to another, and in a manner that provides privacy for users associated with the devices.

DETAILED DESCRIPTION

In the following description, numerous specific details are set forth in order to provide a thorough understanding of the presented concepts. The presented concepts may be practiced without some or all of these specific details. In other instances, well known process operations have not been described in detail so as not to unnecessarily obscure the described concepts. While some concepts will be described in conjunction with the specific examples, it will be understood that these examples are not intended to be limiting.

Various embodiments disclosed herein provide the ability to identify devices and enable the providing of web content to such devices based on estimations of such devices' online behavior. More specifically, embodiments disclosed herein retrieve data associated width such devices and generate keyword and probability assignments for such devices. As will be discussed in greater detail below, such keyword and probability assignments may be used to formulate a prediction or estimation of a next action taken by a device. Accordingly, such predictions and estimations may be used to provide relevant web content to the device prior to such actions and in anticipation of such actions. In this way, a user associated with such a device may be provided with relevant web content specifically tailored to that user's particular navigation path on a particular website.

Figure 1:
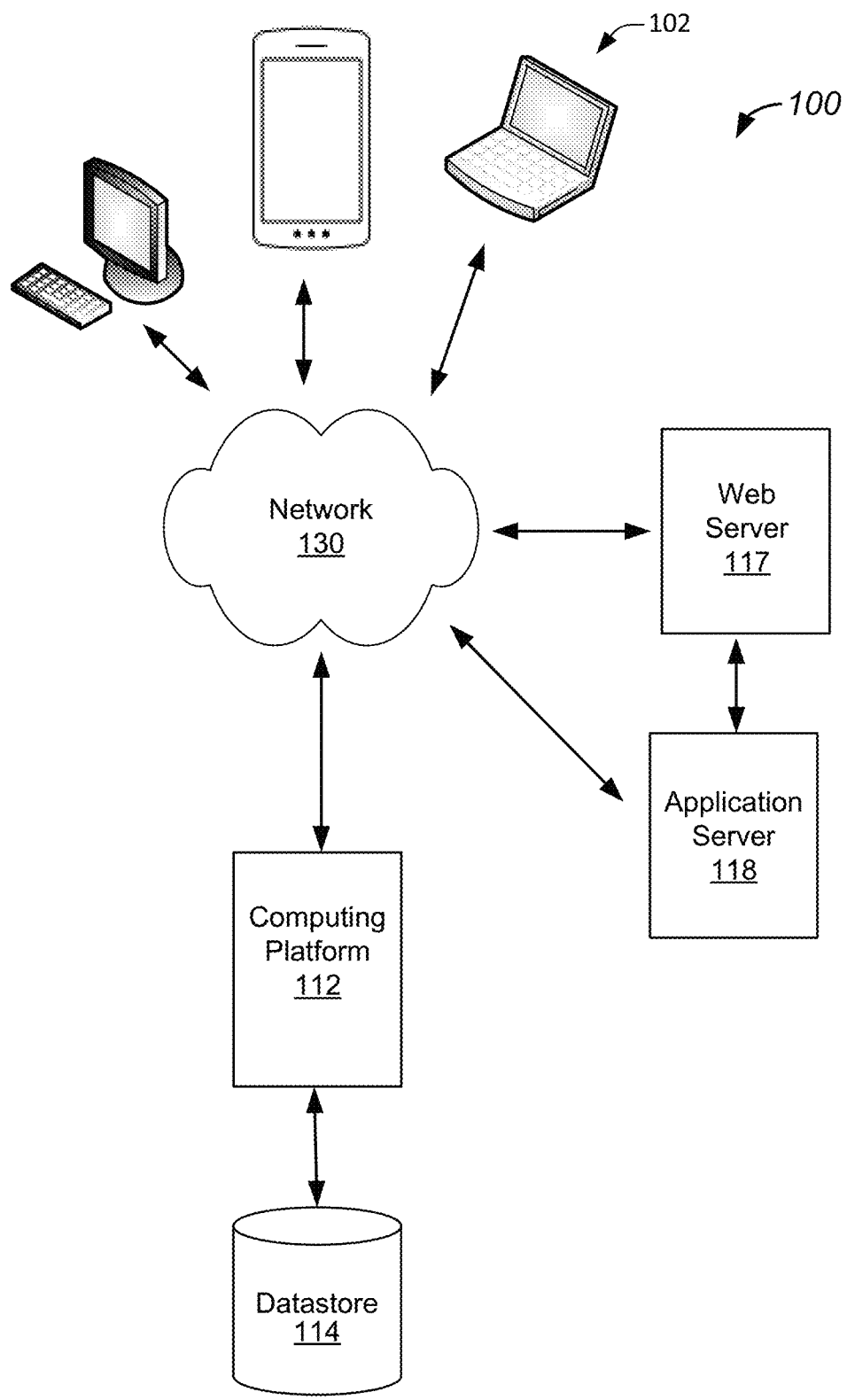
FIG. 1 illustrates a diagram of an example of a system for device identification and keyword assignment, configured in accordance with some embodiments.

FIG. 1 illustrates a diagram of an example of a system for device identification and keyword assignment, configured in accordance with some embodiments. As discussed above, users may use various devices, such as mobile communications devices, to interact with webpages and elements within webpages, as may occur as a user navigates a hierarchy of a webpage, or proceeds along a decision path of a webpage. As will be discussed in greater detail below, systems disclosed herein, such as system 100, may be configured to identify such devices and generate estimations and predictions of their behavior to facilitate the delivery of web content to the users in a predictive manner. In this way, devices may be identified, and content may be provided to them efficiently and intelligently as they progress through a decision path of a webpage.

System 100 may include various client machines, which may also be referred to herein as client devices, such as client machine 102. In various implementations, client machine 102 is a computing device accessible by a user. For example, client machine 102 may be a desktop computer, a laptop computer, a mobile computing device such as a smartphone, or any other suitable computing device. Accordingly, client machine 102 includes one or more input and display devices, and is communicatively coupled to communications network 130, such as the internet. In various implementations, client machine 102 comprises one or more processors configured to execute one or more applications that may utilize a user interface. Accordingly, a user may request and view various different display screens associated with such applications via client machine 102. In various implementations, a user interface may be used to present the display screen to the user, as well as receive one or more inputs from the user. In some implementations, client machine 102 may be used to implement a web browser or a standalone locally executed application. Accordingly, users may use client machine 102 to interact with webpages, and click on data objects included in webpages.

System 100 further includes web server 117 which may be configured to serve webpages to various client machines, such as client machine 102. Accordingly, web server 117 is configured to support one or more communications protocols to handle queries from client machine 102 and to obtain and serve web content to client machine 102. For example, such web content may be one or more webpages that each include various data objects displayed to the user as the user interacts with and navigates a webpage. In some embodiments, system 100 also includes application server 118 that is configured to provide content that may be served to client machine 102 via network 130. For example, application server 118 may provide one or more data objects, such as interactive images, videos, or other data objects, that may be included in a webpage provided to a user via client machine 102. In various embodiments, such data objects may convey various information related to one or more actions the user is taking, such as clicking on a button of a webpage or entering information in a data field. The data objects may also convey information associated with a type of webpage that is being viewed by the user, such as a sports webpage or a shopping webpage. While FIG. 1 illustrates one application server 118 and web server 117, it will be appreciated that system 100 may include any number of web servers and application servers.

System 100 may additionally include computing platform 112 that is configured to identify devices, such as client machine 102, and additionally, to intelligently predict behavior of such devices as users associated with the devices progress through decision paths of the webpage. As will be discussed in greater detail below, computing platform 112 may be configured to identify devices using device identifiers, and also to assign such devices keywords and associated probabilities. Accordingly, the stored keywords and probabilities determined for a particular device may identify one or more aspects of a next action taken by the user of the device, as well as a probability of such a next action occurring. In some embodiments, the keyword may be used to identify a type of next action, and may also be used to identify a data object to be provided to the user in anticipation of that next action.

Moreover, as will be discussed in greater detail below, such device identification may be implemented in the context of secure computing environments where action histories or previous data events might not be available. For example, a user may have been interacting with a webpage in a secure computing environment other than computing platform 112, and such interactions might not be visible to computing platform 112. In various embodiments, computing platform 112 may detect the user and associated client machine leaving that secure computing environment, by for example, switching applications or browsers, and may use additional aggregated data to compensate, at least in part, for the inaccessible interaction data retained in the secure computing environment. Additional details regarding computing platforms are discussed in greater detail below in at least FIG. 2. System 100 further includes datastore 114 that may store data associated with computing platform 112. Accordingly, datastore 114 may be a database system or a distributed file storage system that may be included within computing platform 112 or may be implemented separately.

Figure 2:
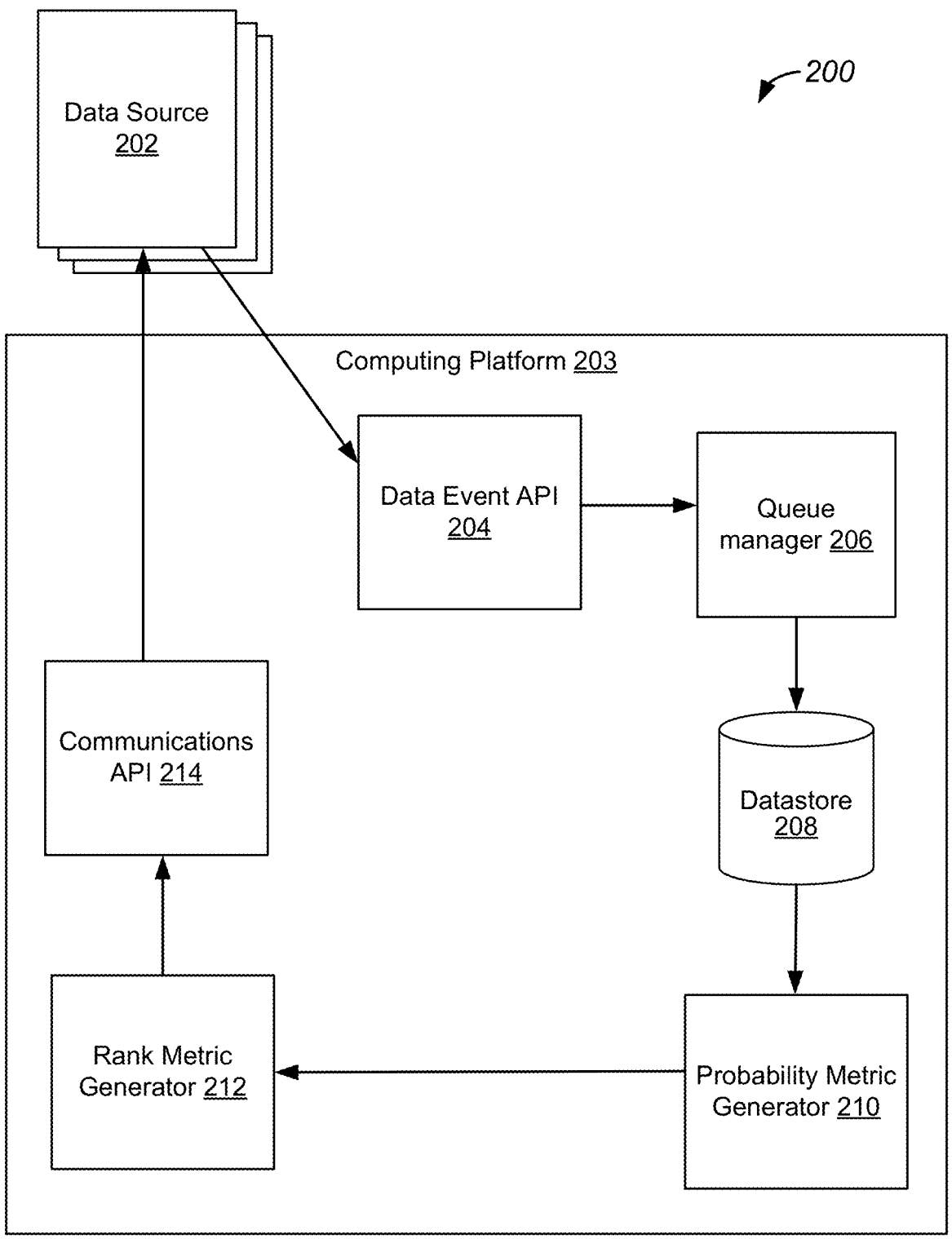
FIG. 2 illustrates a diagram of another example of a system for device identification and keyword assignment, configured in accordance with some embodiments.

FIG. 2 illustrates a diagram of another example of a system for device identification and keyword assignment, configured in accordance with some embodiments. As discussed above, users may use various devices, such as mobile communications devices, to interact with webpages and elements within webpages, as may occur as a user navigates a hierarchy of a webpage, or proceeds along a decision path of a webpage. As will be discussed in greater detail below, systems disclosed herein, such as system 200, may be configured to aggregate data events associated with devices used by users, and to generate predictive keywords and probability metrics for those devices. Such predictive metrics may then be used to intelligently serve web content to the users in anticipation of their future actions.

In various embodiments, system 200 includes data source 202 which may be a data storage system configured to store various information about a plurality of users and associated client machines. For example, data source 202 may be a database system that aggregates data associated with users as they navigate webpages and conduct other actions online. For example, data source 202 may include various data objects identify data events such as device interactions. More specifically, data events may represent a user clicking on or interacting with a particular element of a webpage, the user accessing a webpage, as well as other user events, such as hovers over elements or the entering of textual data in a data field. The data events may also include particular device interactions such as device identifiers and metadata associated with mobile device interactions with routers and servers. In various embodiments, data source 202 may be a third-party data provider that aggregates such data from various different sources, and stores such data in a database system in an unstructured format.

In various embodiments, system 200 further includes computing platform 203 which is configured to identify devices using device identifiers, and also to assign such devices keywords and associated probabilities, as similarly discussed above. Accordingly, computing platform 203 is configured to generate keywords and probability metrics for devices that estimate aspects of a previous data event associated with a device, as well as determine what web content should be provided to the device in anticipation of a future data event. In one example, the device may have just left a secure computing environment, and no immediate activity history may be available. In this example, the generated keyword and probability metric may be used to estimate what actions the device was recently taking within the secure computing environment.

In various embodiments, computing platform 203 data event application program interface (API) 204 which is configured to generate structured data objects from the data received from data source 202. More specifically, data event API 204 is configured to generate data objects for particular types of data events, and store such structured data objects in a queryable format. For example, data event API 204 may be configured to identify data events for a particular device associated with a user, and for a particular data event, such as a user click on a portion of a webpage, and may be configured to generate structured data objects having a designated and queryable format for such identified data events. For example, the structured data objects may be configured to have particular data values represented in particular data fields to facilitate the implementation of queries discussed in greater detail below. More specifically, the structured data objects may be configured based on a particular query scheme that includes a queryable data field for each of a keyword, a website identifier, a geographical indicator, a time stamp, a click count, and a total interaction count. Data event API 204 may be configured to generate such structured data objects for any number of types of data events and users, and store such data in a storage system of computing platform 203, such as datastore 208, via other components discussed in greater detail below.

In various embodiments, computing platform 203 includes components configured to facilitate queries and ingestion of the structured data objects, and thus manage aspects of a stream of ingested data. For example, computing platform 203 may include queue manager 206 that is configured to retrieve structured data objects from data event API 204. Moreover, queue manager 206 may be communicatively coupled to a data storage location, such as datastore 208, that may be used to provide data to other components of system 200, such as probability metric generator 210 discussed in greater detail below. Accordingly, queue manager 206 may manage the ingestion of data from data event API 204 into datastore 208.

Computing platform 203 includes probability metric generator 210 that is configured to generate and assign a highest probability keyword to each unique instance of unstructured data described above associated with a particular client machine, as may be identified by its unique device identifier. More specifically, probability metric generator 210 may be configured to generate one or more probability metrics that are conditional probabilities of a device performing one or more actions, such as a click, on web content having a keyword given one or more additional conditions, such as a geographical location and a type of webpage. For example, the probability metric may be a conditional probability that a device will click on content associated with a particular keyword when the device is located in a geographical region, such as the United States of America, and on a particular type of webpage, such as a Yahoo® webpage. In various embodiments, the conditional probability may be stored as a probability metric.

As will be discussed in greater detail below, the probability metric may be generated based on the aggregated and structured data described above. Accordingly, the ingested data may be used to identify probabilities of keywords' association with various aspects of the data, such as geographic location and website type. The identified probabilities may be combined into a composite metric that is stored for a particular keyword. Moreover, as will be discussed in greater detail below, probabilities may be updated based on subsequent actions taken by devices and users associated with such devices. Accordingly, keyword assignments may be validated, and accuracy of such assignments may be improved.

In various embodiments, probabilities may be computed based on one or more identifiers and count numbers obtained as a result of a database query. For example, a database query may be executed based on one or more query parameters that may include web content data object identifiers, geographical identifiers, and user identifiers. A count value may be obtained based on the query parameters. For example, the query parameters may be used to query the database and identify data events that match the identifiers included in the query parameters. More specifically, a data events may be retrieved for each of the query parameters, and a total count value may be determined for each query parameter. The total count value for a query parameter may be the number of data events identified and retrieved for that query parameter. A probability may then be computed for each query parameter for a given keyword. For example, of the retrieved data events for a query parameter, a number of data events that was assigned a keyword may be determined and may be divided by the total count value for that query parameter to determine a probability. This may be done for each query parameter, and a combination, such as a product, of the probabilities may be used to generate a composite probability for the given keyword. This may be repeated for multiple keywords as may be determined based on a designated pool of keywords. As previously discussed, the designated pool of keywords may have been defined by an entity, such as a user or administrator, may have been retrieved from a storage location, such as a data table in a database, and/or may have been inferred from one or more additional sources, such as metadata of a website or a semantic analysis of other web content. In various embodiments, composite probabilities may be generated for each of multiple keywords, and the composite probabilities may be sorted and ranked. In this way, a keyword with a highest composite probability may be identified and used for subsequent assignment and web content delivery, as will be discussed in greater detail below.

Accordingly, a probability may be computed for each query parameter, and a joint probability may be computed based on a product of the individual probabilities. More specifically, a first probability may be computed for a keyword being associated with a web content data object that was clicked on given a particular geographical region. A second probability may be computed for the keyword being associated with a web content data object that was clicked on given a particular website. A third probability may be computed for a keyword being associated with a web content data object that was clicked on given a particular device identifier. A product of the three probabilities may be computed to obtain a composite probability metric. It will be appreciated that while three probabilities were discussed, any suitable number of query parameters and probabilities may be used to generate the composite probability metric. Additional details of the determination of the probability metrics are discussed in greater detail below with reference to FIG. 6.

Computing platform 203 includes rank metric generator 212 which may be configured to generate a result object based on the probability metrics determined by probability metric generator 210. For example, rank metric generator 212 may be configured to identify the probabilities determined for all keywords, and to sort them according to likelihood, as determined by the probability. In this way, rank metric generator 212 may generate a ranked list of the results provided by probability metric generator 210. In various embodiments, a dedicated number of results may be included in a result object. For example, a top 5 keywords may be included in a result object that is provided to one or more other system components, as will be discussed in greater detail below. In various embodiments, parameters of rank metric generator 212 may be configurable and customizable. For example, an entity, such as a user or system administrator, may identify a sorting or ranking technique as well as a designated number or results. In this way, results of the keyword and probability assignment process may be arranged and packaged in a configurable manner.

Computing platform 203 includes communications API 214 which is configured to facilitate communications between computing platform 203 and other components. Accordingly, results of the computation of keywords and probability metrics included in a result object may be provided to other entities, such as data source 202 or application servers or web servers. In this way, the generated keywords and probability metrics may be provided to other entities that may then use those keywords and probability metrics to serve web content to a device associated with a user in the manner described above. In various embodiments, communications API is configured to generate a message that includes the keywords and probability metrics, and that is capable of being transmitted to such entities. Accordingly, communications API 214 may include the keywords and probability metrics in a message capable of network transmission, and may handle the transmission of such message.

Figure 3:
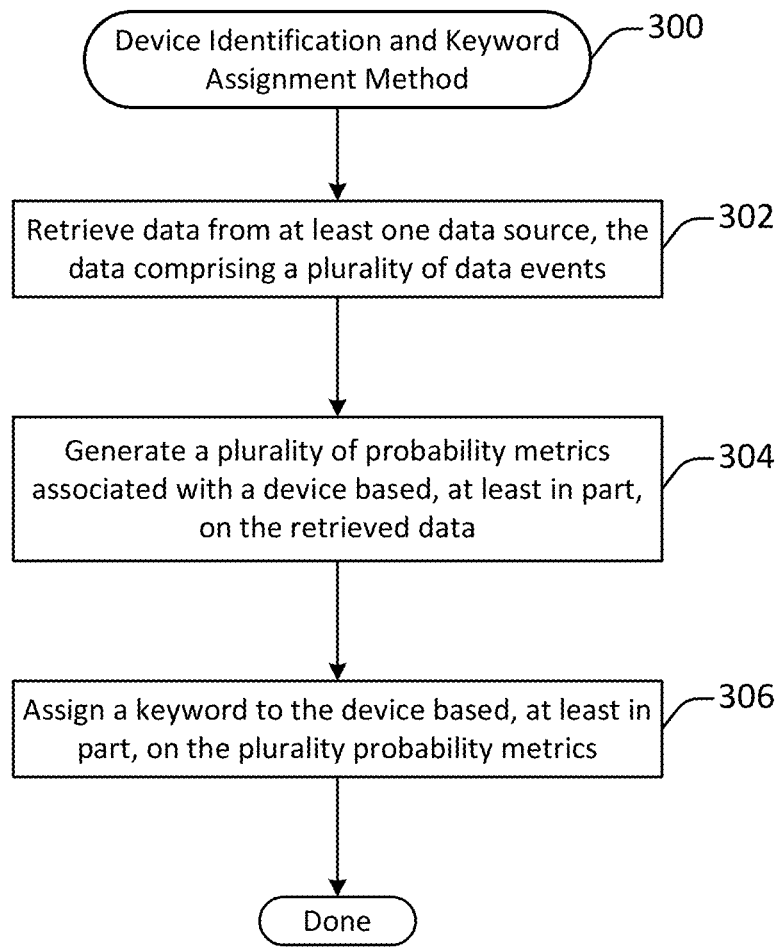
FIG. 3 illustrates a flow chart of an example of a method for device identification and keyword assignment, configured in accordance with some embodiments.

FIG. 3 illustrates a flow chart of an example of a method for device identification and keyword assignment, configured in accordance with some embodiments. As discussed above, data events associated with devices may be aggregated and used to generate predictive keywords and probability metrics for those devices. As will be discussed in greater detail below, methods disclosed herein, such as method 300, may be implemented to assign such keywords in a manner that improves the providing or web content to such devices and associated users.

Accordingly, method 300 may commence with operation 302 during which data may be retrieved from at least one data source. As discussed above, the data source may be a data aggregator or third-party data provider. Such data may be unstructured data that is converted into a structured format. As also discussed above, the data may include various data events. Accordingly, during operation 302, data representing various data events associated with multiple devices may be retrieved from various different data sources. Moreover, the data events may have associated data event parameters that represent specific features of the data events, such as a geographical location and type of website underlying a data event.

Method 300 may proceed to operation 304 during which a plurality of probability metrics may be generated. As discussed above, the probability metric may be generated based on the retrieved data and device identifier information included within the retrieved data. Accordingly, for each unique instance of a device identifier, keywords may be identified, and conditional probabilities may be generated for each keyword. As also noted above, one or more composite probability metrics may be generated based on a combination of probabilities. In this way, multiple keyword/probability combinations may be determined for each unique instance of a device identifier.

Method 300 may proceed to operation 306 during which a keyword may be assigned to the device based, at least in part, on the plurality of probability metrics. Accordingly, as similarly discussed above, the keyword/probability combinations may be sorted and ranked, and a designated number of keywords may be selected and assigned to a particular device. For example, a top keyword or a keyword with the highest probability may be assigned to the device and mapped to the device identifier as an assigned keyword. The assigned keyword may then be stored in a database system or datastore, as discussed above. In various embodiments, the assigned keyword may be included in an activity estimation parameter that may be included in a message and transmitted to one or more other entities, as will be discussed in greater detail below.

Figure 4:
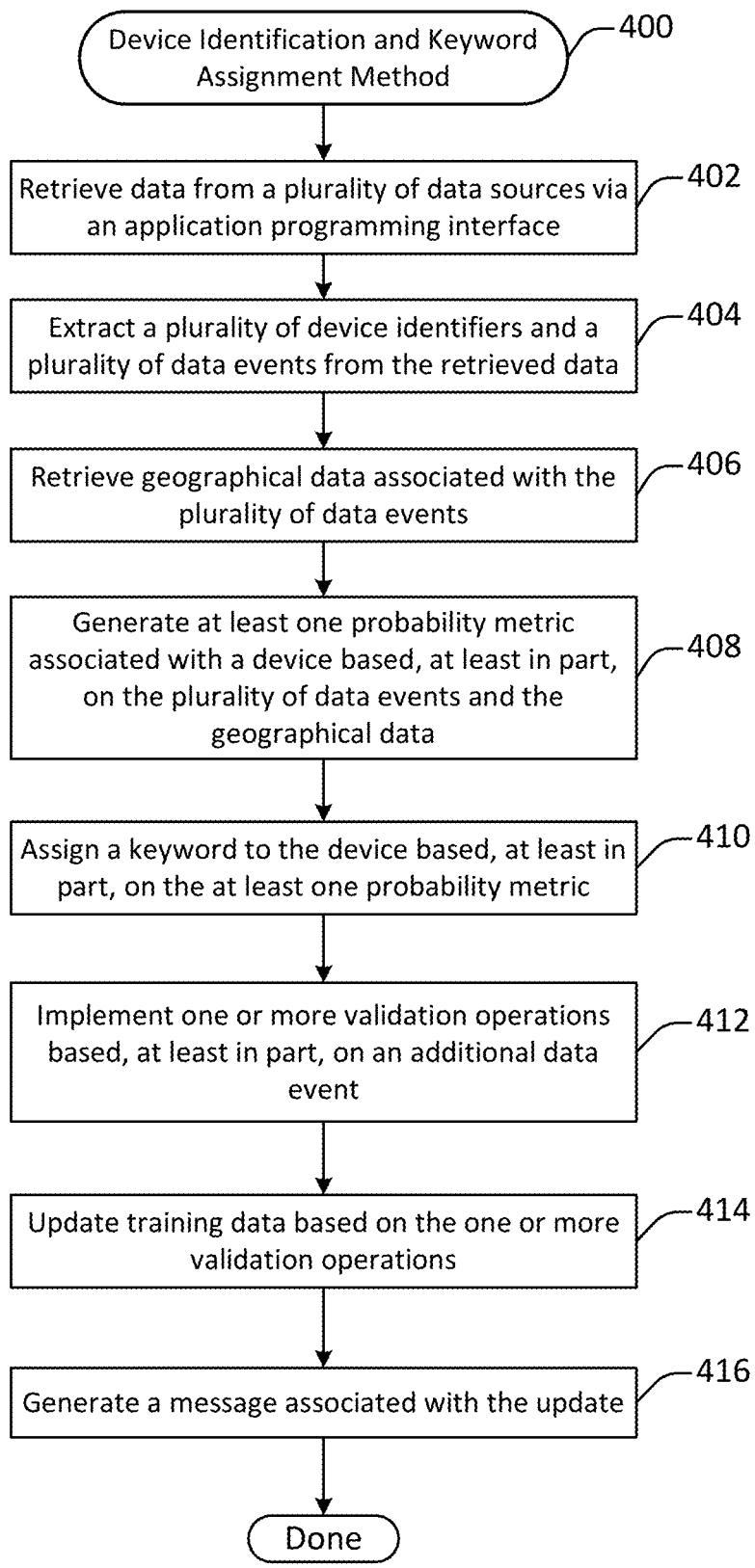
FIG. 4 illustrates a flow chart of another example of a method for device identification and keyword assignment, configured in accordance with some embodiments.

FIG. 4 illustrates a flow chart of another example of a method for device identification and keyword assignment, configured in accordance with some embodiments. As similarly discussed above, data events associated with devices may be aggregated and used to generate predictive keywords and probability metrics for those devices. As will be discussed in greater detail below, methods disclosed herein, such as method 400, may be implemented to assign such keywords as well as verify the assignment of such keywords to improve the accuracy of such assignments.

Accordingly, method 400 may commence with operation 402 during which data may be retrieved from a plurality of data sources. As similarly discussed above, the data sources may be data aggregators or third-party data providers. Accordingly, during operation 402, multiple different data sources may be queried to retrieve data. In another example, data may be received from multiple data sources as part of a periodic data ingestion from such data sources. As discussed above, the retrieved data may be unstructured, and may include various data events in heterogenous formats.

Method 400 may proceed to operation 404 during which a plurality of device identifiers and a plurality of data events may be extracted from the retrieved data. Accordingly, as discussed above, the unstructured data may be converted to a structured format arranged based, at least in part, on parameters of a query schema. During the data conversion, the retrieved data may be analyzed, and device identifiers may be extracted. Moreover, data events associated with such device identifiers may also be extracted. As discussed above, the data events may correspond to actions associated with the devices, and interactions with other entities, such as webpages and web servers. Accordingly, during operation 404, the data underlying the structured data objects may be extracted, and the structured data objects may be generated.

Method 400 may proceed to operation 406 during which geographical data may be retrieved. In various embodiments, the geographical data may be inferred from the retrieved data. More specifically, an interne protocol (IP) address included in a data event may be used to identify geographical region. Such an identification may be made based on an existing look-up table of IP addresses and geographical regions. For example, a particular IP address may be mapped to an approximate location of San Jose, California. Moreover, the geographical data may be stored in the structured data objects. In some embodiments, geographical regions may be identified based on information included in a request received from a device. For example, a geographical region may be identified based on one or more header source data values of a request from an HTTP client.

Method 400 may proceed to operation 408 during which a plurality of probability metrics may be generated. As discussed above, the probability metric may be generated based on the retrieved data and device identifier information included within the retrieved data. Accordingly, for each unique instance of a device identifier, keywords may have been identified and stored in the structured data. Accordingly, during operation 408, conditional probabilities may be generated for each keyword associated with each device identifier. As also noted above, one or more composite probability metrics may be generated based on a combination of probabilities, and the composite probability metrics may be stored in the structured data. In some embodiments, the composite probabilities may be stored in a separate data object, such as a data table.

Method 400 may proceed to operation 410 during which a keyword may be assigned to the device based, at least in part, on the plurality of probability metrics. Accordingly, as similarly discussed above, the keyword/probability combinations may be sorted and ranked, and a designated number of keywords may be selected and assigned to a particular device. In one example, a top keyword or a keyword with the highest probability may be assigned to the device and mapped to the device identifier as an assigned keyword. The assigned keyword may then be stored in the structure data.

Method 400 may proceed to operation 412 during which one or more validation operations may be implemented based, at least in part, on an additional data event. In various embodiments, an additional data event may be received subsequent to the assignment of the keyword during operation 410. For example, a user associated with a client machine may take another action and interact with another webpage. The corresponding data event may be received, and it may be determined if one or more keywords associated with the new data event matches the previously assigned keyword. Accordingly, during operation 412, the validation operation may determine if one or more of the keywords associated with the new data event matches the assigned keyword. In some embodiments, the determination comprises the computation of a similarity score that represents a similarity between the keyword for the new data event and the assigned keyword.

In various embodiments, verification operations may be implemented in combination with a redundant or separate instance of the system described above. For example, a first amount of data may be sent to the primary system and may be assigned keywords, as discussed above. Moreover, a second amount of data may be sent to a secondary system and assigned random keywords. For example, a pool or random keywords may have been previously determined, and may be used for random assignment. In one example, 90 percent of data may be fed to the primary system and 10 percent of data may be fed to the secondary system. In various embodiments, keywords that are assigned, but not matched to subsequent data events are identified as a first type of error. Moreover, data events associated with keywords that were not assigned may be identified as a second type of error.

Method 400 may proceed to operation 414 during which training data may be updated based on the one or more validation operations. In various embodiments, a machine learning algorithm may be used to facilitate keyword assignment. Accordingly, during operation 414, training data associated with the machine learning algorithm may be updated. In various embodiments, the one or more machine learning algorithms may be implemented in the context of a distributed file system, such as a Hadoop file system. Accordingly, the one or more machine learning algorithms may be updated based on an iteration of validation operations, and in this way, the computation of probability metrics may be updated as well.

Method 400 may proceed to operation 416 during which a message may be generated. In various embodiments, the message may include the results of the keyword assignment and the validation operations. Accordingly, the message may include an updated keyword assignment, and such a message may be provided to another entity, such as a data source or an application server, as similarly discussed above. In this way, the accuracy of the keyword assignment may be refined, and updated keyword assignments may be propagated to one or more downstream entities.

Figure 5:
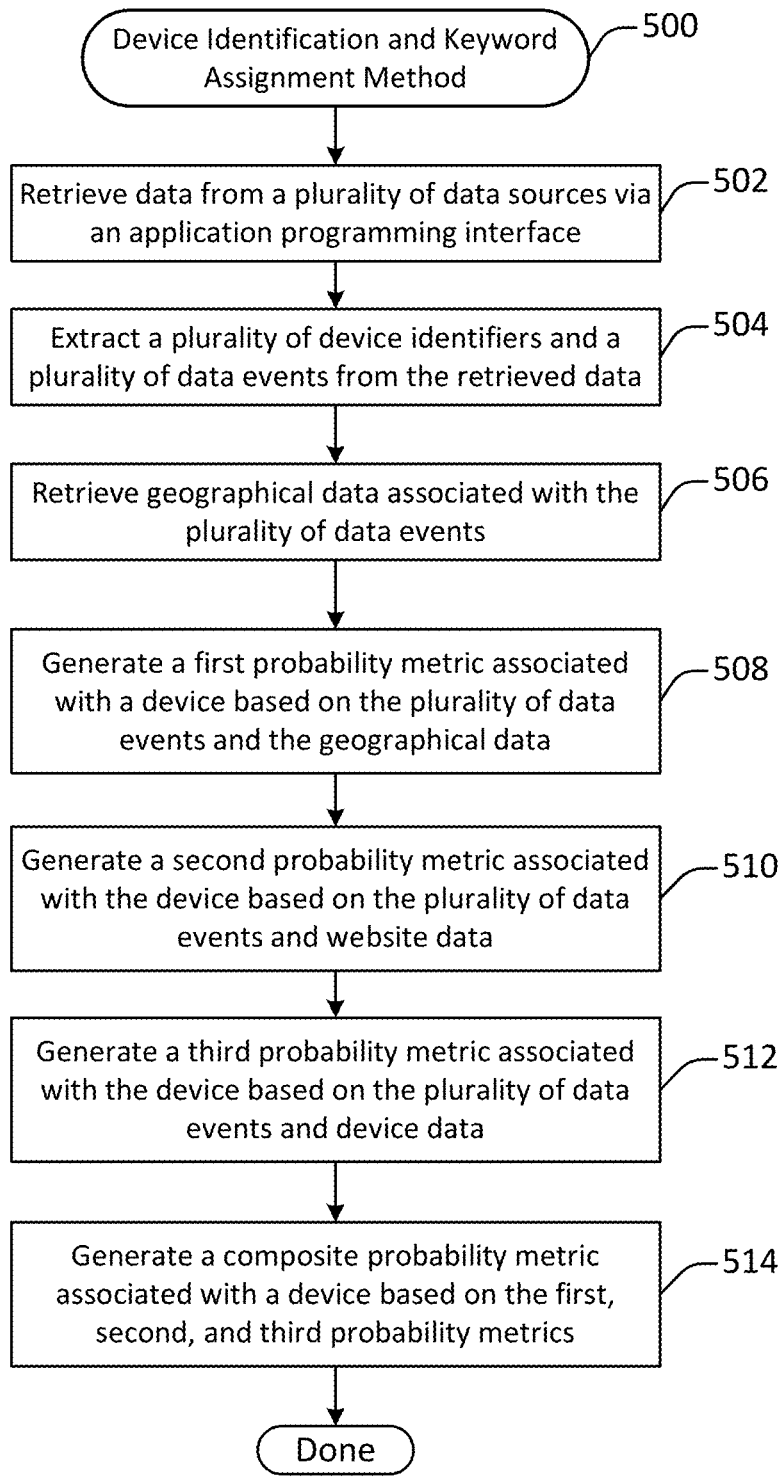
FIG. 5 illustrates a flow chart of yet another example of a method for device identification and keyword assignment, configured in accordance with some embodiments.

FIG. 5 illustrates a flow chart of yet another example of a method for device identification and keyword assignment, configured in accordance with some embodiments. As similarly discussed above, data events associated with devices may be aggregated and used to generate predictive keywords and probability metrics for those devices. As will be discussed in greater detail below, methods disclosed herein, such as method 500, may be implemented to generate various probability metrics underlying the assignment of keywords and prediction of device behavior.

Accordingly, method 500 may commence with operation 502 during which data may be retrieved from a plurality of data sources. As similarly discussed above, the data sources may be data aggregators or third-party data providers. Accordingly, during operation 502, multiple different data sources may be queried to retrieve data. In another example, data may be received from multiple data sources as part of a periodic data ingestion from such data sources. Moreover, as similarly discussed above, the retrieved data may be unstructured, and may include various data events and associated data in heterogenous formats.

Method 500 may proceed to operation 504 during which a plurality of device identifiers and a plurality of data events may be extracted from the retrieved data. Accordingly, as discussed above, the unstructured data may be converted to a structured format arranged based, at least in part, on parameters of a query schema. During the data conversion, the retrieved data may be analyzed, and device identifiers may be extracted. Moreover, data events associated with such device identifiers may also be extracted. Accordingly, during operation 504, the data underlying the structured data objects may be extracted, and the structured data objects may be generated.

Method 500 may proceed to operation 506 during which geographical data may be retrieved. In various embodiments, the geographical data may be inferred from the retrieved data. As similarly discussed above, an internet protocol (IP) address included in a data event may be used to identify geographical region. Moreover, other information, such as HTTP request headers, may also be used to identify a geographical region. Such an identification may be made based on an existing look-up table of IP addresses and geographical regions. Moreover, the geographical data may be stored in the structured data objects.

Method 500 may proceed to operation 508 during which a first probability metric may be generated. In various embodiments, the first probability metric is generated based on an association between a data event and geographical data. More specifically, a system component, such as a probability metric generator, may analyze the structured data objects, and determine how likely a device is to take a particular action, such as clicking on specific web content, when the device is in a particular geographical region. For example, for devices in the United States of America, it may be determined how many devices out of a total number of devices have taken the particular action, and a first probability may be generated based on this determination.

Method 500 may proceed to operation 510 during which a second probability metric may be generated. In various embodiments, the second probability metric is generated based on an association between the data event and website data. More specifically, a system component, such as a probability metric generator, may analyze the structured data objects, and determine how likely a device is to take a particular action when the device is using a particular type of website. For example, for devices utilizing an MSN® website, it may be determined how many devices out of a total number of devices have taken the particular action, and a second probability may be generated based on this determination.

Method 500 may proceed to operation 512 during which a third probability metric may be generated. In various embodiments, the third probability metric is generated based on an association between the data event and device data. More specifically, a system component, such as a probability metric generator, may analyze the structured data objects, and determine how likely a specific device for which a keyword is being requested is to take a particular action. For example, the device data may be used to identify a specific client machine, and historical event data associated with that client machine may be used to identify how often that client machine takes a particular action, such as clicks on particular web content. Such a determination may be made based on a number of previous instances of this action compared to a total number of actions taken. A third probability may be generated based on this determination.

Method 500 may proceed to operation 514 during which a composite probability metric may be generated. In various embodiments, the composite probability metric is generated based on a combination of the first, second, and third probability metrics. For example, the composite probability metric may be generated by taking a product of the first probability metric, the second probability metric, and the third probability metric. As similarly discussed above, such probability metrics may be determined based on count-based probability determinations, or any other suitable probability determination technique.

Figure 6:
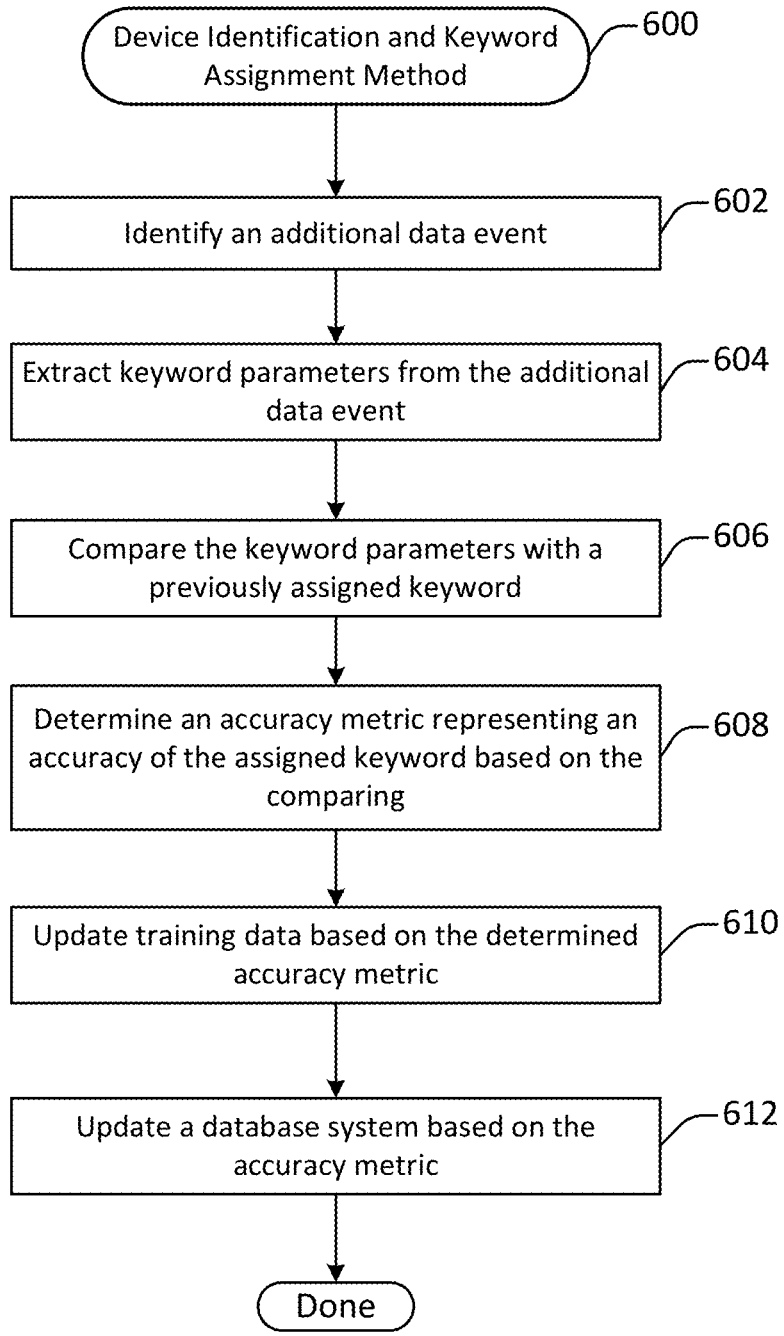
FIG. 6 illustrates a flow chart of an additional example of a method for device identification and keyword assignment, configured in accordance with some embodiments.

FIG. 6 illustrates a flow chart of an additional example of a method for device identification and keyword assignment, configured in accordance with some embodiments. As similarly discussed above, data events associated with devices may be aggregated and used to generate predictive keywords and probability metrics for those devices. As will be discussed in greater detail below, methods disclosed herein, such as method 600, may be used to implement validation operations to increase the accuracy of device behavior prediction.

Accordingly, method 600 may commence with operation 602 during which an additional data event may be identified. As similarly discussed above, an additional data event may be received subsequent to an initial assignment of a keyword to a particular device identifier associated with a client machine. More specifically, a user associated with a client machine may take another action and interact with another webpage. The interaction may be logged as a data event and received at a data source, such as a third-party data provider. The additional data event may then be converted to a structured data object and stored in a datastore.

Method 600 may proceed to operation 604 during which keyword parameters may be extracted from the additional data event. As noted above, the additional data event may be converted to a structured data object, and one or more keywords may be extracted from the structured data object. In this way, one or more keywords may be identified for the additional data event, and the one or more keywords may be stored as keyword parameters.

Method 600 may proceed to operation 606 during which the keyword parameters may be compared with a previously assigned keyword. Accordingly, the keyword parameters may be compared with the previously assigned keyword to see if the keywords match. As similarly discussed above, assigned keywords may be compared against a keyword included in the additional data event, and it may be determined if they match. As will be discussed in greater detail below, one or more accuracy metrics may be generated based on the result of the comparison, as well as the identification of one or more types of errors, as discussed above.

Method 600 may proceed to operation 608 during which an accuracy metric may be determined. In various embodiments, the accuracy metric represents an accuracy of the previously assigned keyword. As similarly discussed above, the accuracy metric may be s a similarity score generated based on a determination of an amount of similarity between the previously assigned keyword and the new keyword parameters. Accordingly, semantic or natural language processing techniques may be implemented to characterize a similarly between one or more new keywords and one or more assigned keywords. In some embodiments, the similarity score may be a numerical score or may be some other indicator, such as a flag.

Method 600 may proceed to operation 610 during which training data may be updated. As discussed above, training data associated with one or more machine learning algorithms may be updated by being fed the most recent results. As also discussed above, such training data may be stored in the context of a distributed file system, and the updating of the training data may modify or adjust the one or more machine learning algorithms to ensure the determination of probability metrics is implemented based on the most recent and accurate data.

Method 600 may proceed to operation 612 during which a database system may be updated. Accordingly, a data storage system of the computing platform may be update to store the newly updated training data, the accuracy metric, as well as any updates made to the assigned keyword for the client machine associated with the additional data event. It will be appreciated that method 600 may be implemented periodically such that assigned keywords are periodically and automatically updated. In some embodiments, method 600 may be implemented responsive to one or more conditions, such as detection of a data ingestion event. Accordingly, method 600 may be triggered when new data is received from a data source.

Figure 7:
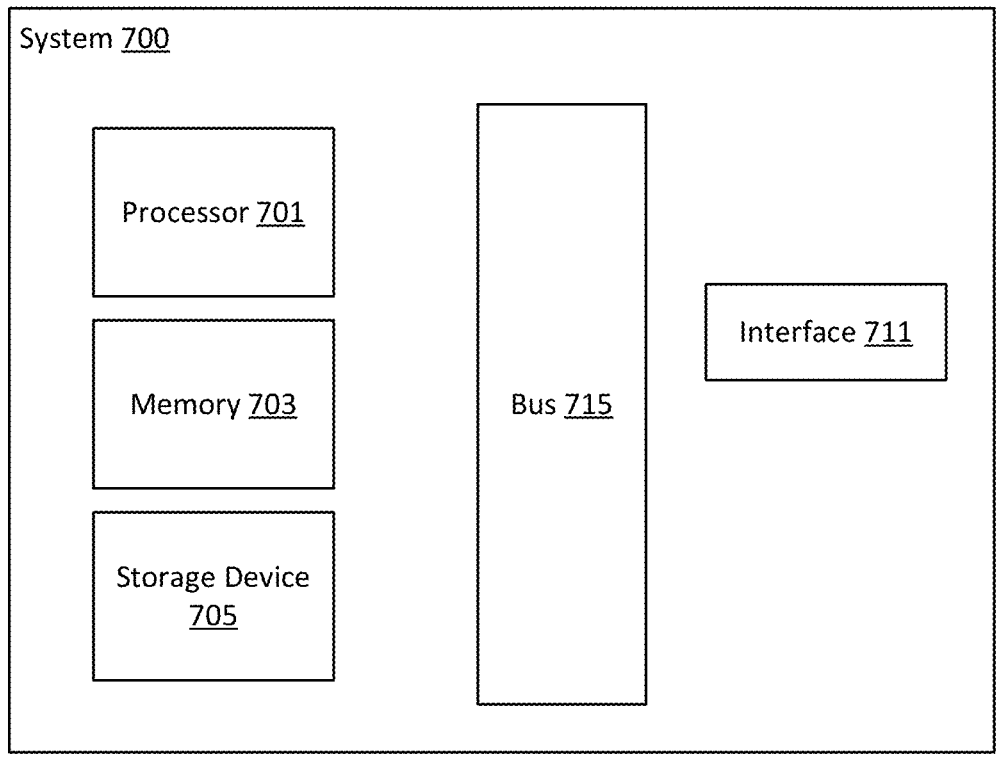
FIG. 7 illustrates one example of a computing device, configured in accordance with some embodiments.

FIG. 7 illustrates one example of a computing device, configured in accordance with some embodiments. According to various embodiments, system 700 suitable for implementing embodiments described herein includes a processor 701, a memory module 703, a storage device 705, an interface 711, and a bus 715 (e.g., a PCI bus or other interconnection fabric.) System 700 may operate as variety of devices such as an application server, a web server, or any other device or service described herein. Although a particular configuration is described, a variety of alternative configurations are possible. The processor 701 may perform operations such as those described herein. Instructions for performing such operations may be embodied in the memory 703, on one or more non-transitory computer readable media, or on some other storage device. Various specially configured devices can also be used in place of or in addition to the processor 701. The interface 711 may be configured to send and receive data packets over a network. Examples of supported interfaces include, but are not limited to: Ethernet, fast Ethernet, Gigabit Ethernet, frame relay, cable, digital subscriber line (DSL), token ring, Asynchronous Transfer Mode (ATM), High-Speed Serial Interface (HSSI), and Fiber Distributed Data Interface (FDDI). These interfaces may include ports appropriate for communication with the appropriate media. They may also include an independent processor and/or volatile RAM. A computer system or computing device may include or communicate with a monitor, printer, or other suitable display for providing any of the results mentioned herein to a user.

Any of the disclosed implementations may be embodied in various types of hardware, software, firmware, computer readable media, and combinations thereof. For example, some techniques disclosed herein may be implemented, at least in part, by computer-readable media that include program instructions, state information, etc., for configuring a computing system to perform various services and operations described herein. Examples of program instructions include both machine code, such as produced by a compiler, and higher-level code that may be executed via an interpreter. Instructions may be embodied in any suitable language such as, for example, Apex, Java, Python, C++, C, HTML, any other markup language, JavaScript, ActiveX, VBScript, or Perl.

Examples of computer-readable media include, but are not limited to: magnetic media such as hard disks and magnetic tape; optical media such as flash memory, compact disk (CD) or digital versatile disk (DVD); magneto-optical media; and other hardware devices such as read-only memory ("ROM") devices and random-access memory ("RAM") devices. A computer-readable medium may be any combination of such storage devices.

In the foregoing specification, various techniques and mechanisms may have been described in singular form for clarity. However, it should be noted that some implementations include multiple iterations of a technique or multiple instantiations of a mechanism unless otherwise noted. For example, a system uses a processor in a variety of contexts but can use multiple processors while remaining within the scope of the present disclosure unless otherwise noted. Similarly, various techniques and mechanisms may have been described as including a connection between two entities. However, a connection does not necessarily mean a direct, unimpeded connection, as a variety of other entities (e.g., bridges, controllers, gateways, etc.) may reside between the two entities. Accordingly, Although the foregoing concepts have been described in some detail for purposes of clarity of understanding, it will be apparent that certain changes and modifications may be practiced within the scope of the appended claims. It should be noted that there are many alternative ways of implementing the processes, systems, and devices. Accordingly, the present examples are to be considered as illustrative and not restrictive.

What is claimed is:

1. A method comprising:
retrieving, using one or more processors, data from at least one data source, the data comprising a plurality of data events associated with a plurality of devices;
generating, using the one or more processors, a plurality of probability metrics for each of the plurality of devices based on device information and data event parameters included in the retrieved data, wherein generating the plurality of probability metrics includes generating and assigning a first high probability keyword to first unstructured data associated with a first device in the plurality of devices and a second different probability keyword to second unstructured data associated with a second device in the plurality of devices; and
generating, using the one or more processors, an activity estimation parameter for each of the plurality of devices based on the plurality of probability metrics, the activity estimation parameter comprising an estimated probability of a subsequent data event being taken by a device.

2. The method of claim 1, wherein the plurality of probability metrics is determined based on a plurality of device identifiers included in the device information, geographical data associated with the plurality of data events, and data event parameters comprising a type of website associated with the plurality of data events.

3. The method of claim 1, wherein the generating of the plurality of probability metrics further comprises:
generating a conditional probability metric for each of a plurality of keywords associated with each of the plurality of devices.

4. The method of claim 3, wherein the generating of the activity estimation parameter further comprises:
generating a composite probability metric based on a combination of conditional probability metrics; and
identifying a keyword associated with the composite probability metric.

5. The method of claim 1 further comprising:
receiving an additional data event associated with at least one of the plurality of devices.

6. The method of claim 5 further comprising:
generating an accuracy metric based on a comparison of an additional keyword and the activity estimation parameter.

7. The method of claim 6 further comprising:
updating training data based on the accuracy metric.

8. The method of claim 1 further comprising:
generating a message comprising the activity estimation parameter.

9. The method of claim 8, wherein the message comprises an updated keyword.

10. A system comprising:
a communications interface configured to send and receive network traffic;
a storage device configured to store data values in a database; and
one or more processors configured to:
retrieve data from at least one data source, the data comprising a plurality of data events associated with a plurality of devices;
generate a plurality of probability metrics for each of the plurality of devices based on device information and data event parameters included in the retrieved data, wherein generating the plurality of probability metrics includes generating and assigning a first high probability keyword to first unstructured data associated with a first device in the plurality of devices and a second different probability keyword to second unstructured data associated with a second device in the plurality of devices; and
generate an activity estimation parameter for each of the plurality of devices based on the plurality of probability metrics, the activity estimation parameter comprising an estimated probability of a subsequent data event being taken by a device.

11. The system of claim 10, wherein the plurality of probability metrics is determined based on a plurality of device identifiers included in the device information, geographical data associated with the plurality of data events, and data event parameters comprising a type of website associated with the plurality of data events.

12. The system of claim 10, wherein the generating of the plurality of probability metrics further comprises:
generating a conditional probability metric for each of a plurality of keywords associated with each of the plurality of devices.

13. The system of claim 12, wherein the generating of the plurality of probability metrics further comprises:
generating a composite probability metric based on a combination of conditional probability metrics; and
identifying a keyword associated with the composite probability metric.

14. The system of claim 10, wherein the one or more processors are further configured to:
receive an additional data event associated with at least one of the plurality of devices; and
generate an accuracy metric based on a comparison of an additional keyword and the activity estimation parameter.

15. The system of claim 14, wherein the one or more processors are further configured to:
update training data based on the accuracy metric.

16. A non-transitory computer readable medium embodying a computer program product, said computer program product comprising a non-transitory computer-readable program code capable of being executed by one or more processors, said the program code comprising instructions configurable to cause the one or more processors to perform a method comprising:

retrieving, using one or more processors, data from at least one data source, the data comprising a plurality of data events associated with a plurality of devices;

generating, using the one or more processors, a plurality of probability metrics for each of the plurality of devices based on device information and data event parameters included in the retrieved data, wherein generating the plurality of probability metrics includes generating and assigning a first high probability keyword to first unstructured data associated with a first device in the plurality of devices and a second different probability keyword to second unstructured data associated with a second device in the plurality of devices; and generating, using the one or more processors, an activity estimation parameter for each of the plurality of devices based on the plurality of probability metrics, the activity estimation parameter comprising an estimated probability of a subsequent data event being taken by a device.

17. The non-transitory computer readable medium of claim 16, wherein the plurality of probability metrics is determined based on a plurality of device identifiers included in the device information, geographical data associated with the plurality of data events, and data event parameters comprising a type of website associated with the plurality of data events.

18. The non-transitory computer readable medium of claim 16, wherein the generating of the plurality of probability metrics further comprises:

generating a conditional probability metric for each of a plurality of keywords associated with each of the plurality of devices.

19. The non-transitory computer readable medium of claim 18, wherein the generating of the activity estimation parameter further comprises:

generating a composite probability metric based on a combination of conditional probability metrics; and identifying a keyword associated with the composite probability metric.

20. The non-transitory computer readable medium of claim 18, wherein the program code further comprises instructions for:

receiving an additional data event associated with at least one of the plurality of devices;

generating an accuracy metric based on a comparison of an additional keyword and the activity estimation parameter; and updating training data based on the accuracy metric.

\* \* \* \* \*